Nov. 1, 1960     A. E. F. JOHNSON     2,958,127
METHOD OF JOINING TUBULAR MEMBERS
Original Filed Oct. 30, 1952
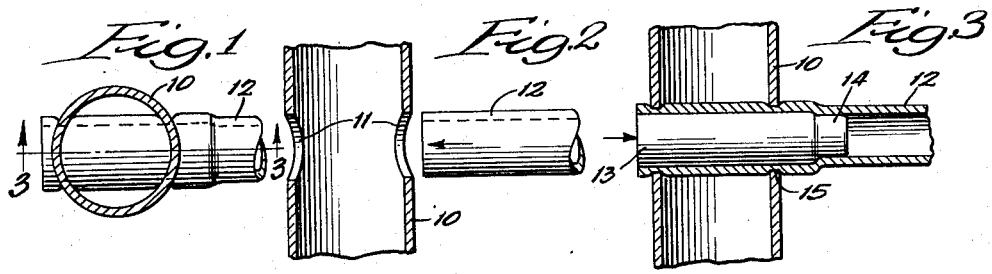
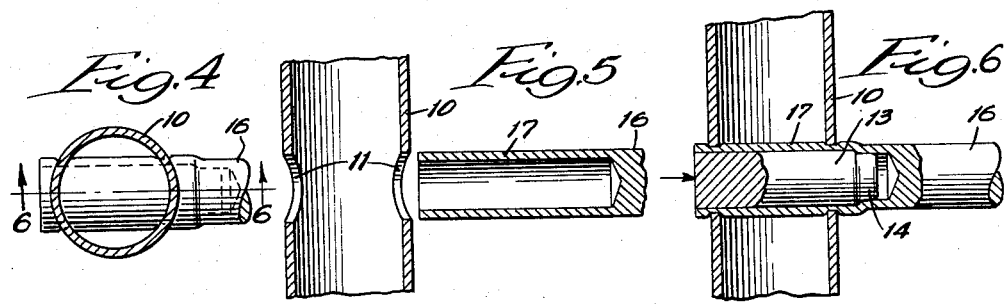
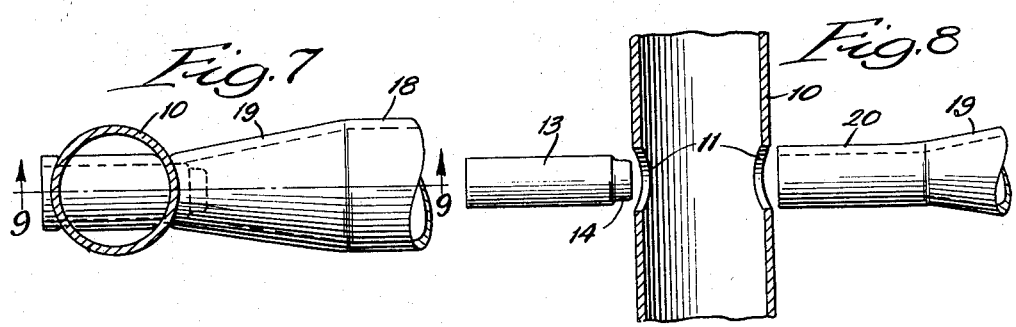
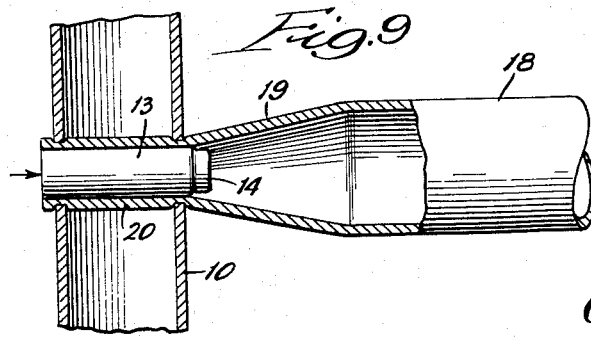
INVENTOR:
Axel E. F. Johnson,
BY Dawson, Tilton, Fallon & Lungmus,
ATTORNEYS.

United States Patent Office 2,958,127
Patented Nov. 1, 1960

2,958,127

METHOD OF JOINING TUBULAR MEMBERS

Axel E. F. Johnson, Cincinnati, Ohio, assignor to American Hospital Supply Corporation, Evanston, Ill., a corporation of Illinois Original application Oct. 30, 1952, Ser. No. 317,760, now Patent No. 2,846,249, dated Aug. 5, 1958. Divided and this application Oct. 24, 1957, Ser. No. 692,076

3 Claims. (Cl. 29—523)

This invention relates to a joint for tubular members and a method of forming the same. The invention is highly useful in connecting cylindrical metal parts or tubes in the fabrication of various types of structures and through the use of integral interlocking parts on the joined members. The present application is a division of my copending application, Serial No. 317,760, filed October 30, 1952, now Patent Number 2,846,249 issued August 5, 1958.

An object of the present invention is to provide a method and means for joining tubular members without employing welding or utilizing bonding materials. A further object is to provide an effective method for the union of tubular parts by utilizing integral portions on the two parts to provide the interlock therebetween. Yet another object is to provide a method for joining tubular metal parts and the like, or parts having tubular portions, whereby one of the parts extends transversely through the other and is provided with raised portions enclosing the edge portions of the other member to form an interlock. Other specific objects and advantages will appear as the specification proceeds.

The invention is shown, in illustrative embodiments, by the accompanying drawing, in which—

Figure 1 is a broken top plan view of tubular elements joined together in accordance with my invention; Figure 2, a vertical sectional view showing one tubular member provided with an opening and the end portion of another tubular member to be inserted therethrough; Figure 3, a sectional view, the section being taken as indicated by the line 3—3 of Figure 1; Figure 4, a view similar to Figure 1 but showing a modified form of the invention; Figure 5, a sectional view showing a solid member having a tubular portion about to be introduced through a transverse opening in the other tubular member; Figure 6, a sectional view, the section taken taken as indicated at line 6—6 of Figure 4; Figure 7, a view similar to Figure 1 but showing a further modified form of the invention; Figure 8, an assembly view, partly in section, showing the parts of Figure 7 prior to the forming of the joint; and Figure 9, a broken sectional view, the section being taken as indicated at line 9—9 of Figure 7.

In the illustration given in Figures 1 to 3, inclusive, 10 designates a cylindrical member which is provided with a transverse opening 11 extending therethrough. Thus, in forming a transverse opening or passage through the tube 10, it is necessary to form two aligned openings 11, as illustrated more clearly in Figure 2. A second cylindrical member 12 is passed through the transverse opening 11 and preferably the outside diameter of the member 12 is such as to cause it to fit fairly tightly the opening 11 within member 10. A problem is presented in attempting to unite the two tubular members after they are thus arranged at right angles to each other with the tube 12 extending through the opening 11 of tube 10, because the edge of the metal around each opening 11 lies in a plurality of planes and, of course, such edge would not fall within an annular groove if the same were formed in the tubular member 12. I have found that a sturdy interlock can be formed between the two members by pressing an expander tool such as a solid cylindrical wedge 13 having preferably a reduced forward end portion 14 through the tube 12, as indicated more clearly in Figure 3, to expand the tube 12 and cause it to lock itself into the outer cylindrical member 10. The expander tool or solid cylindrical wedge 13 should be longer than the diameter of the outer tube 10 so as to expand the tube 12 against the outer faces of the outer tube 10, as shown more clearly in Figure 3. In the operation described, I find that the tube 12 expands on either side of the metal edges 15 about the opening 11 so as to form not annular grooves but grooves which extend in an arcuate plane along the exterior of tube 12 to receive the edges 15 of the outer tube 10. The resulting interlock is unusually strong by reason of the connection of the two parts along such arcuate lines.

In the modification shown in Figures 4, 5 and 6, a solid bar 16 is provided at its end with a hollow or tubular portion 17, and the latter is passed through the opening 11 of tube 10 in the same manner as described above in connection with Figures 1, 2 and 3. The expansion is similarly caused by passing the expander tool 13 through the hollow portion 17 of the bar 16 to interlock the parts as illustrated in Figures 4 and 6.

In the embodiment illustrated in Figures 7 to 9, inclusive, a cylindrical member 18 is provided with a downwardly-inclined end portion 19 terminating in a tubular portion 20 of substantially uniform diameter. The portion 20 is extended through the opening or openings 11 in the member 10 and then expanded therein by placing the expander tool 13 therein, as above described. In this structure, the inclined wall 19 is effective in aligning the tubular members 12 and 18 and the inward movement of the expander bar 13 forms the beads on both sides of the edges of the metal about the opening 11 so as to firmly unite the members.

In each of the operations described, the expander tool not only causes the metal of the inner cylindrical member to flow outwardly about the edges of the outer cylindrical member to produce the groove, but also such action causes the flowing metal about such edges to bring about a firm and rigid interlock between the parts. Since the inner tubular member is extended beyond the edges of the outer tubular member and the expander tool is also passed through the inner tube beyond such edges, there is formed a bead structure of angular or arcuate shape on the inner tube and on each side of the edges about the openings 11. It is further found that this joint possesses unusual strength and rigidity.

While in the foregoing specification I have set forth specific structures in considerable detail for the purpose of illustrating embodiments of the invention, it will be understood that such details of structure may be varied widely by those skilled in the art without departing from the spirit of my invention.

I claim:

1. In a method for joining two tubular members against separation and relative rotation, the members being cylindrical and of different internal and external diameters, the steps of forming a pair of aligned non-planar circular openings in the cylindrical wall of the tube of larger diameter, said openings corresponding in size to the external diameter of the smaller of said tubes, inserting a portion of said smaller tube through both of said openings, and thereafter expanding said portion of said smaller tube both internally and externally of said larger tube, whereby the expanded portions of the smaller tube adjacent said non-planar openings interlock said members securely together and fix the same against relative rotation.

2. In a method for joining against separation and relative rotation two members having tubular portions of different internal and external diameters, the smaller of said tubular portions having an external diameter smaller than the internal diameter of the larger of said tubular portions, the steps comprising forming a pair of aligned non-planar circular openings in the wall of the larger of said tubular portions, said openings corresponding in size to the external diameter of the smaller of said tubular portions, inserting the smaller of said tubular portions through both of said openings, and thereafter expanding the smaller of said tubular portions both internally and externally of said larger tubular portion, whereby the expanded zones of the smaller tubular portion adjacent said non-planar openings interlock said members securely together and fix the same against relative rotation.

3. In a method for joining tubular members of different internal and external diameters, the steps of forming a pair of non-planar and diametrically disposed openings in the tubular wall of the larger of said members, said openings corresponding in size to the external diameter of the smaller of said members, extending the smaller of said members through both of said non-planar openings, and thereafter forcing an expander tool through the interior of the smaller of said tubular members to provide the same with expanded zones of increased external diameter immediately adjacent said non-planar openings and internally and externally of the larger of said members, thereby locking said members securely together against independent relative rotation.

References Cited in the file of this patent

UNITED STATES PATENTS

| | | |
|---|---|---|
| 1,762,313 | Snow et al. | June 10, 1930 |
| 2,101,707 | Ewing | Dec. 7, 1937 |
| 2,552,630 | Hutchinson | May 15, 1951 |
| 2,614,827 | Peach et al. | Oct. 21, 1952 |

FOREIGN PATENTS

| | | |
|---|---|---|
| 3,091 | Great Britain | 1907 |
| 815,282 | Germany | Oct. 1, 1951 |